(12) United States Patent
Nieminen

(10) Patent No.: US 6,589,424 B1
(45) Date of Patent: Jul. 8, 2003

(54) METHOD OF MAKING SCREEN CYLINDER AND SCREEN CYLINDER

(75) Inventor: Erkka Nieminen, Tampere (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/560,408

(22) Filed: Apr. 27, 2000

Related U.S. Application Data

(63) Continuation of application No. PCT/FI98/00822, filed on Oct. 22, 1998.

(30) Foreign Application Priority Data

Oct. 29, 1997 (FI) .................................................. 974084

(51) Int. Cl.⁷ ......................... B01D 29/35; B01D 29/44; B01D 39/10
(52) U.S. Cl. .................... 210/497.01; 210/498; 209/395
(58) Field of Search ........................... 210/497.01, 498; 209/393, 395; 162/251; 29/896.62

(56) References Cited

U.S. PATENT DOCUMENTS

| | | | |
|---|---|---|---|
| 3,716,144 A | * | 2/1973 | Bartlow .................. 210/497.01 |
| 3,805,955 A | * | 4/1974 | Bixby et al. .................. 219/58 |
| 4,264,438 A | * | 4/1981 | Frejborg ...................... 209/300 |
| 4,697,060 A | | 9/1987 | Izuwa et al. |
| 5,718,826 A | | 2/1998 | Frejborg |
| 6,426,003 B2 | * | 7/2002 | May et al. .................. 209/395 |

FOREIGN PATENT DOCUMENTS

| | | |
|---|---|---|
| EP | A1 0 705 649 | 4/1996 |
| WO | A1 97/34045 | 9/1997 |
| WO | A1 98/14658 | 4/1998 |

\* cited by examiner

Primary Examiner—Matthew O. Savage
(74) Attorney, Agent, or Firm—Alston & Bird LLP

(57) ABSTRACT

A method for making a screen cylinder is described in which screen wires are arranged on the inner surface of a support wire at certain intervals and attached by a weld from the outer surface of the support wire. In a preferred embodiment of the invention, the screen wires are arranged in mounting grooves provided on the inner surface of the support wire and welded by a welding method providing deep penetration so that the weld extends through the support wire from the outer surface of the hoop to the screen wire. In another embodiment, a welding groove is formed on the outer surface of the support wire and the weld is effected in the welding groove. The invention further relates to a screen cylinder manufactured by the method of the invention.

3 Claims, 2 Drawing Sheets

METHOD OF MAKING SCREEN CYLINDER AND SCREEN CYLINDER

CROSS-REFERENCE TO RELATED APPLICATION

This application is a continuation of pending PCT International Application PCT/FI98/00822, filed Oct. 22, 1998, designating inter alia the United States.

FIELD OF THE INVENTION

The invention relates to a method of making a screen cylinder, in which method screen wires are arranged next to each other at predetermined intervals and attached parallel to the axis of the screen cylinder onto the inner surface of support hoops, and the support hoops are then bent to form an annular shape, whereby the screen wires provide a cylindrical screen surface on the inside of the support hoops.

The invention also relates to a screen cylinder for cleaning or sorting a pulp mixture, the screen cylinder comprising screen wires arranged parallel to the axis of the screen cylinder at predetermined intervals to provide a cylindrical screen surface, said screen wires being attached onto the inner surface of support hoops arranged around them.

BACKGROUND OF THE INVENTION

Screen cylinders are used, for example, for cleaning and sorting a pulp mixture. They are manufactured by attaching parallel screen wires that provide a screen surface side by side in a cylindrical shape so that there remains a slot of a desired size between them. Generally this is performed by providing grooves in separate support wires at even intervals, and then arranging the screen wires in the grooves at even intervals. Subsequently, the screen wires are usually attached to the support wires by welding or brazing, and the so formed sheet-like unit is then bent to form a cylinder, and the ends of the support wires are joined by welding so that they form support hoops. The screen cylinders, however, are difficult and slow to manufacture in the known manner. In addition, the welding produces burrs, spatters and the like where the fibres adhere to and then detach from as larger masses, thereby causing problems in the steps that follow.

Further, EP 0 705 649 discloses a method of making a screen cylinder based on an interlocking fit. In the solution of the publication, the profile of the screen wires, and the mounting grooves provided in the support hoops are such that the rods inserted in the grooves stay in the grooves when the support hoops are bent. The profile of the screen wires, and the grooves of the support hoop, however, are expensive to make. Any deflections caused by inaccuracy in the manufacture easily impair the attachment, which in turn produces vibration that is harmful to the operation and durability of the screen cylinder.

SUMMARY OF THE INVENTION

The present invention seeks to overcome the disadvantages noted above, by providing a screen cylinder and method of making a screen cylinder in which the screen wires are attached to each support wire by welding them thereto from the side of the support wire facing away from the screen wire in such a way that the weld extends to the screen wire, thereby firmly attaching each screen wire to the support wire. Accordingly, the visible portion of the weld lies on the outside of the screen cylinder, and hence any burrs or the like resulting from the welding operation will not impair the performance of the screen cylinder.

Mounting grooves are preferably provided for the screen wires at suitable intervals on the inner surface of the support wire, i.e., on the surface that is on the inside of a finished screen cylinder. The screen wires are inserted into the grooves, after which they are attached to the support wire by a weld provided from the outside of the support wire, i.e., from the side facing away from the mounting grooves. After the attachment, a cylindrical structure is formed by bending the support wires to form support hoops. In one embodiment of the invention, the weld joining a screen wire to the support wire is provided from the outside of the support wire by using a welding method with sufficiently deep penetration so that the weld extends through the thickness of the support wire into the screen wire. In another embodiment, a welding groove extending partway through the thickness of the support wire toward the mounting grooves is provided on the outer surface of the support wire, and the welding is performed at the welding groove. This enables a continuous weld to be effected along the welding groove to secure all of the screen wires to the support wire. In yet another embodiment, the mounting grooves on the inside of the support wire and the welding groove on the outside intersect so that a screen wire arranged in the mounting groove is visible from the side of the welding groove and can be attached at the groove by a weld. The welding is thus not performed through the support wire.

The advantage of the invention is that the welding is performed on that side of the support wire which will be on the outer surface of the screen cylinder. Consequently, no rough points, bulges or the like are formed on the inside of the screen cylinder as a result of the attachment of the wires. Furthermore, the weld does not necessarily need to be ground or otherwise finished to remove rough points, which means that this slow and expensive finishing step can be eliminated. Where the support wire includes the welding groove, the support wire can be fairly broad and therefore rigid. Due to the welding groove, the weld can be provided such that the penetration of the welding is sufficient to firmly attach a screen wire to the support wire. Further, as noted above, a continuous weld can be made along the bottom of the welding groove, whereby the weld need not be aligned separately at each screen wire. The weld is thus quick to make, and the action can be easily automated.

BRIEF DESCRIPTION OF THE DRAWINGS

The invention will be described in greater detail in the attached drawings, in which.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
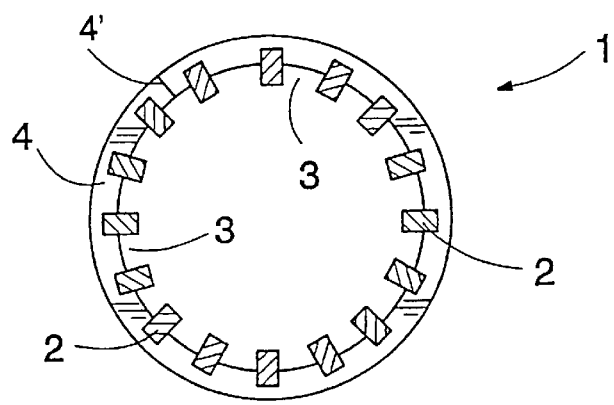
FIG. 1 shows a schematic cross-sectional view of a screen cylinder of the invention, seen in the axial direction of the screen cylinder.

FIG. 1 is a schematic cross-sectional view of a screen cylinder of the invention, seen in the axial direction of the screen cylinder. The figure shows a screen cylinder 1 with screen wires 2 on its inner surface, along the entire inner circle of the screen cylinder 1, so that they provide a screen surface. Between the screen wires 2 there are screen slots 3, through which the liquid and the desired amount of fibre can flow out from the screen cylinder. Any sticks, too large fibres, fibre bundles and other material to be separated will remain on the inner surface of the screen cylinder 1. The separated material is then removed through one end of the screen cylinder 1. The screen cylinder 1 is made by attaching the screen wires 2 to support hoops 4 before the support hoops 4 are bent to form a ring of a desired size. In the present description, references to the screen wires being welded to the support hoops will be understood to encompass both welding the screen wires to the support wires before the support wires are bent to form support hoops, as well as welding the screen wires to the support wires after the support wires have been bent to form support hoops. Preferably, the screen wires 2 are attached before the support hoops 4 are bent, since the manufacture of a planar unit is quicker and more easy to automate. The support hoops 4 are arranged at suitable intervals parallel to the axis of the screen cylinder 1 so that the screen wires 2 stay sufficiently rigidly and firmly in place. The screen wires 2 are attached to the support hoop 4 by welding, but the attachment is also enhanced by compression on the inner surface of the support hoop 4, caused by the bending of the support hoop 4. In the figure, the ends of the support hoops are joined by welding at point 4, so that a ring-shaped structure is formed. Further, the distance between the screen wires is rather long and the number of screen wires is rather small, although in reality the number of wires in a screen cylinder is rather large and the distance between the wires is very small.

Figure 2A:
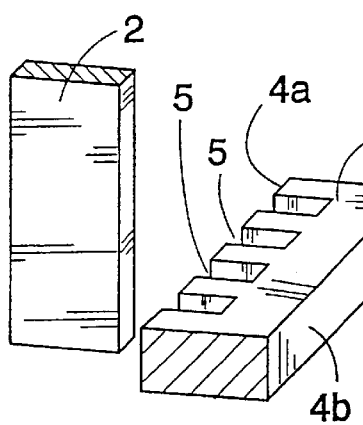
FIGS. 2a to 2c show a schematic view of how the screen wires of the screen cylinder can be attached to a support hoop in the invention.
Figure 2B:
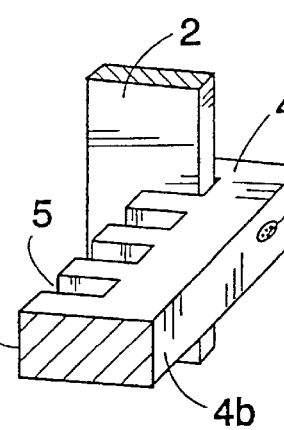
Figure 2C:
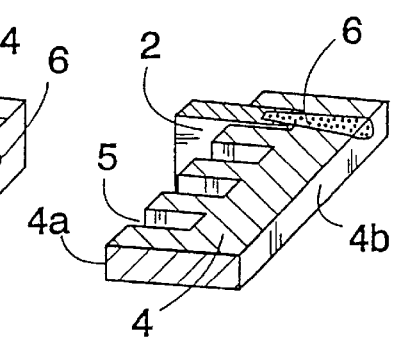

FIG. 2a shows a simplified view of a screen wire 2 and a support hoop 4 before they are attached to each other. The cross-section of the screen wire 2 may vary in shape: it need not have the simplified rectangular shape shown in the figure. The edge that comes into contact with the support hoop 4 is preferably rounded, and so is the bottom of the mounting groove 5 in the support hoop 4, whereby the notch effect, which impairs durability, can be avoided. With regard to the manufacture, it is advantageous if the mounting grooves have straight walls, so that they are easy to ream or flame-cut. The essential point is that mounting grooves 5 corresponding to the cross-section of the screen wire 2 are provided on the inner surface 4a of the support hoop 4, and the screen wires 2 are inserted into the grooves in the manner shown in FIG. 2b. The mounting grooves 5 and the screen wires 2 are preferably in firm contact with each other at their lateral and counter surfaces so that the screen wire 2 cannot vibrate when the pressure changes. FIG. 2c shows how the screen wire 2 is attached to the support hoop 4 by welding: a weld with deep penetration and extending from the outer surface 4b of the support hoop 4 is provided. Each screen wire 2 is attached by a different weld. The welding methods that can be used include, for example, arc welding, resistance welding and beam welding. The penetration of the weld can naturally be improved by providing a welding groove, such as a notch or a hole, on the outer surface 4b of the support hoop. FIG. 2c shows a weld 6 extending through the support hoop 4 from the outer surface 4b of the hoop to the screen wire 2. The visible sections of the weld 6 will then be on the outer surface of the screen cylinder 1, and readily adhering particles are then not easily attached to the weld from the pulp that is filtered. Further, the weld 6 is protected by the support hoop 4 from the sorted pulp flow coming from the screen cylinder. The weld 6 need thus not be finished by grinding, and the quality and appearance of the surface are not relevant. The main point is that the weld 6 ensures that the screen wire 2 is firmly attached.

Figure 3:
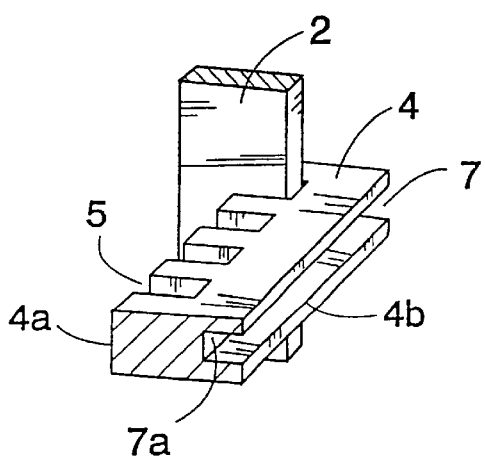
FIG. 3 shows a schematic view of a second way of attaching the screen wires to the support hoops in the invention.

FIG. 3 in turn illustrates an embodiment in which a welding groove 7 extending over the entire length of the support hoop 4 is formed on the outer surface 4b of the support hoop, and in which a weld joining the screen wire 2 and the support hoop 4 can be provided by welding through the bottom 7a of the groove. The structure allows for larger dimensions for the support hoop 4 in the radial direction of the screen cylinder, which enables a more rigid structure. The thickness of material between the bottom 7a of the welding groove and the bottom of the mounting groove 5 can be arranged to be such that the penetration of the welding method used is sufficient. The weld will here be protected in the welding groove 7. When the support hoops 4 have been bent, an additional hoop with a protrusion corresponding to the groove can be arranged in the groove. The additional hoop further improves the durability of the structure.

Figure 4:
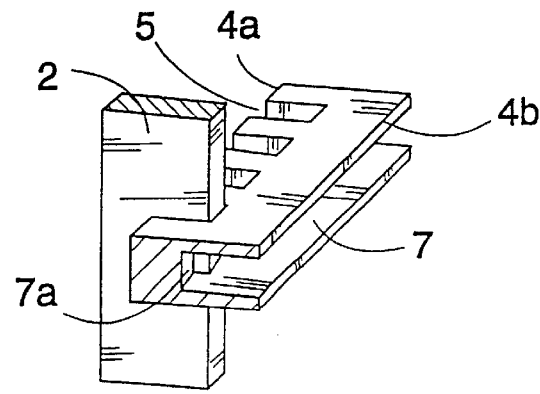
FIG. 4 shows a schematic view of a third way of attaching the screen wires to the support hoops in the invention.

FIG. 4 shows another way of attaching the screen wires 2. The mounting grooves 5 on the inner surface 4a and the welding groove 7 on the outer surface 4b of the support hoop are formed such that they intersect and are thus in contact with each other. When the screen wire 2 is in the mounting groove 5, the edge of the wire on the side of the support hoop 4 extends over the bottom 7a of the welding groove or aligns with the bottom 7a of the welding groove and can thus be seen from the outer surface 4b of the support hoop. The screen wire 2 is thus not welded in the embodiment such that a weld extending through the support hoop 2 would be provided; instead, for example, simply a continuous weld extending over the entire length of the support hoop 4 can be used. The welding is then quick to perform, and it can be easily automated.

Figure 5:
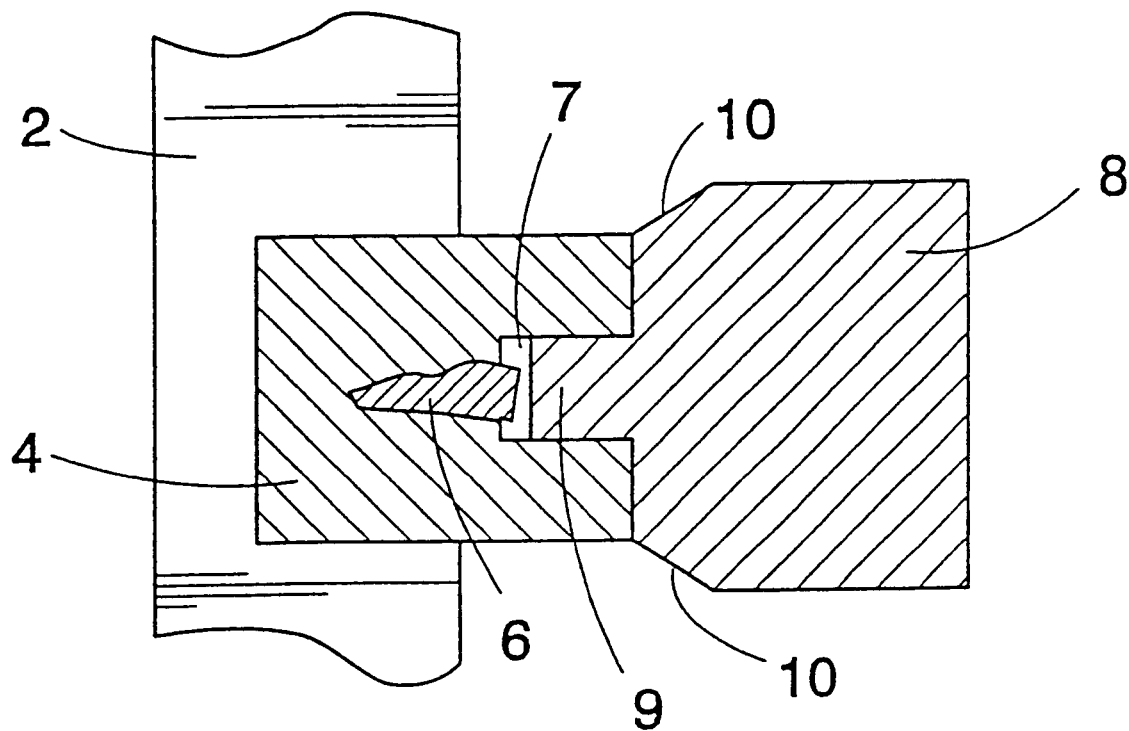
FIG. 5 shows a schematic view of a fourth embodiment of the invention.

FIG. 5 is a schematic view showing how a separate additional hoop can be easily arranged in the embodiments of the invention illustrated in FIGS. 3 and 4. In this embodiment, the additional hoop 8 comprises a protrusion 9 extending to the groove 7 of the support hoop 4, the protrusion locking the additional hoop 8 in place in the axial direction of the screen cylinder. The breadth of the additional hoop 8 can, for example, equal the breadth of the support hoop 4 in the axial direction of the screen cylinder, or it can be even broader as shown in the figure, whereby there are bevels 10 at the edge of the additional hoop 8 facing the screen cylinder, the bevels joining the edge of the screen cylinder that faces the additional hoop 8 smoothly to the support hoop 4, and the additional hoop being broader at the end facing away from the screen cylinder. FIG. 5 also shows how a weld 6 is provided in the support hoop 4 when the welding is performed through the bottom of the welding groove 7. Although it would here also be possible to weld each wire separately as described in FIG. 2c, it is simpler to use continuous welding, whereby a weld is also provided in those parts of the support hoop where there are no screen wires. In the solution of FIG. 4, a weld is provided at the bottom of the welding groove 7 of the support hoop 4 and passes through the edges of the screen wires 2 that are on the side of the welding groove 7.

The drawings and the description thereof are only intended to illustrate the idea of the invention. The invention can vary in its details within the scope of the claims. The welding groove of the support hoop is thus naturally designed so that the attachment suits the welding method used. Also, in the embodiments that involve welding through the support hoop, the portion to be penetrated is naturally designed so that the penetration of the welding method used is sufficient and the joint is thus firm. If, due to bending and inaccuracy in the manufacture, there remain slots between the screen wire and the mounting groove provided in the support hoop, the entire screen cylinder can be chromed, if desired, or coated in some other way, whereby all slots are filled with the coating and there is no risk that the screen wires would vibrate. It is also not compulsory to provide mounting grooves in the support hoop: the screen wires can be arranged at suitable intervals and welded from the outside of the support hoop through the support hoop so that a weld with deep penetration is provided. The manufacture of the support hoop is then naturally simple and also cost-effective. A screen structure like this is naturally not as firm as one provided using grooves and welding, but all the same it can be used successfully in certain applications.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A screen cylinder for cleaning or sorting a pulp mixture, the screen cylinder comprising:

a plurality of support hoops encircling a longitudinal axis of the screen cylinder and spaced apart along an axial direction thereof, each said support hoop having an inner surface facing radially inwardly; and a plurality of screen wires arranged parallel to the longitudinal axis of the screen cylinder and spaced circumferentially at predetermined intervals to provide a cylindrical screen surface, the screen wires being attached onto the inner surfaces of the support hoops, the screen wires being attached to each said support hoop by welding from a side of each said support hoop facing away from the screen wire in such a way that a weld extends to the screen wire, whereby the visible section of the weld is on an outer surface of the screen cylinder;

wherein mounting grooves are defined in the inner surface of each said support hoop and the screen wires are arranged in the mounting grooves before welding, and wherein a welding groove is defined in an outer surface of each said support hoop extending circumferentially therealong, the weld joining the screen wires to the support hoop extending through a bottom of the welding groove to the screen wires.

2. A screen cylinder according to claim 1, further comprising at least one additional ring-shaped support member having a projection fitted in the welding groove of one of the support hoops.

3. A screen cylinder according to claim 1, wherein each said screen wire is attached to a corresponding said support hoop by a separate weld.

* * * * *